US 6,685,325 B1

(12) United States Patent   (10) Patent No.: US 6,685,325 B1
Hulse et al.                (45) Date of Patent:     Feb. 3, 2004

(54) VEHICLE SIDE MIRROR ASSEMBLY WITH INTEGRAL ILLUMINATION AND SIGNAL LIGHTING (75) Inventors: George Robert Hulse, Cookeville, TN (US); John Christopher Brown, Cookeville, TN (US)

(73) Assignee: Federal-Mogul World Wide, Inc., Southfield, MI (US)

(*) Notice: Subject to any disclaimer, the term of this patent is extended or adjusted under 35 U.S.C. 154(b) by 178 days.

(21) Appl. No.: 09/693,392

(22) Filed: Oct. 20, 2000

Related U.S. Application Data (60) Provisional application No. 60/160,789, filed on Oct. 21, 1999.

(51) Int. Cl.⁷ .............................................. G02B 7/182
(52) U.S. Cl. ...................................... 359/879; 362/494
(58) Field of Search .................................. 359/879, 871, 359/872, 876, 880; 362/30, 559, 494, 511, 543, 544

(56) References Cited

U.S. PATENT DOCUMENTS

| 4,101,954 A | 7/1978 | Rietmüller |
| 4,274,078 A | 6/1981 | Isobe et al. .................... 340/98 |
| 4,583,155 A | 4/1986 | Hart |
| 4,661,800 A | 4/1987 | Yamazaki |
| 5,109,214 A | 4/1992 | Heidman, Jr. |
| 5,371,659 A | 12/1994 | Pastrick et al. ............. 362/83.1 |
| 5,402,103 A | 3/1995 | Tashiro |
| 5,497,305 A | 3/1996 | Pastrick et al. |
| 5,497,306 A | 3/1996 | Pastrick |
| 5,548,492 A | 8/1996 | Hansen et al. .............. 362/83.1 |
| 5,587,699 A | 12/1996 | Faloon et al. |
| 5,624,176 A | 4/1997 | O'Farrell et al. |
| 5,669,699 A | 9/1997 | Pastrick et al. |
| 5,669,704 A | 9/1997 | Pastrick et al. |
| 5,669,705 A | 9/1997 | Pastrick et al. |
| 5,774,283 A | 6/1998 | Nagel et al. |
| 5,788,357 A | 8/1998 | Muth et al. |
| 5,823,654 A | 10/1998 | Pastrick et al. |
| 5,863,116 A | 1/1999 | Pastrick et al. |
| 5,871,275 A | 2/1999 | O'Farrell et al. |
| 5,879,074 A | 3/1999 | Pastrick |
| 5,917,968 A | 6/1999 | Wood |
| 5,938,320 A | 8/1999 | Crandall |
| 5,959,790 A | * 9/1999 | Hempelmann ............... 359/841 |
| 5,984,497 A | 11/1999 | Foerstner et al. |
| 6,074,077 A | 6/2000 | Pastrick et al. |

(List continued on next page.)

FOREIGN PATENT DOCUMENTS

| DE | 36 35 471 A1 | 10/1986 |
| DE | 36 35 473 A1 | 10/1986 |
| JP | 62218248 A | 3/1986 |

*Primary Examiner*—Euncha Cherry
(74) *Attorney, Agent, or Firm*—Reising, Ethington, Barnes, Kisselle, P.C.

(57) ABSTRACT

A side vehicle mirror assembly (30) that utilizes a waveguide (42) to route light from a location at the vehicle/mirror assembly interface to an outboard location (46) on the mirror assembly. The side mirror assembly (30) includes the waveguide (42), a mounting member (32), and a mirror (34) attached to the mounting member. The waveguide (42) extends from a first location at the vehicle/mirror assembly interface to a second location at the mirror. A lamp (44) located either in The door panel (38) or at the first location is used to provide light into the waveguide, which then routes the light to the outboard (46) location for exterior illumination or signal lighting. A stacked waveguide arrangement can be used so that these multiple lighting functions can be incorporated together into the mirror assembly. Also disclosed is an optical coupling arrangement for routing light to a breakaway side mirror.

39 Claims, 9 Drawing Sheets

U.S. PATENT DOCUMENTS

| | | |
|---|---|---|
| 6,086,229 A | 7/2000 | Pastrick |
| 6,099,154 A | 8/2000 | Olney |
| 6,099,155 A | 8/2000 | Pastrick et al. |
| 6,149,287 A | 11/2000 | Pastrick et al. |
| 6,176,602 B1 | 1/2001 | Pastrick et al. |
| 6,227,689 B1 | 5/2001 | Miller |
| 6,276,821 B1 | 8/2001 | Pastrick et al. |
| 6,280,069 B1 | 8/2001 | Pastrick et al. |
| 6,290,378 B1 | 9/2001 | Buchalla et al. |
| 6,296,379 B1 | 10/2001 | Pastrick |
| 6,299,333 B1 | 10/2001 | Pastrick et al. |

\* cited by examiner

VEHICLE SIDE MIRROR ASSEMBLY WITH INTEGRAL ILLUMINATION AND SIGNAL LIGHTING

CROSS REFERENCE TO RELATED APPLICATION

This application claims the benefit of the priority of U.S. Provisional Application Ser. No. 60/160,789, filed Oct. 21, 1999.

TECHNICAL FIELD

The present invention relates generally to vehicle exterior illumination and signaling and, more particularly, to the incorporation of exterior illumination and signaling into the vehicle side mirrors and appliques.

BACKGROUND OF THE INVENTION

Side mirror assemblies have now been used for many years to provide exterior illumination and signal lighting. Typically, this is accomplished by mounting an incandescent lamp within the mirror housing itself and then routing electrical power to the lamp through the mirror housing and into the door panel. Sometimes, these side mirror assemblies utilize breakaway mirrors pivotally mounted on a support arm (often called an applique), in which case the power is routed through the pivotal connection to the applique and then into the door panel. See, for example, the following U.S. Pat. No. 4,583,155 to Hart; U.S. Pat. No. 4,661,800 to Yamazaki; U.S. Pat. No. 5,109,214 to Heidman, Jr.; U.S. Pat. No. 5,497,306 to Pastrick; and U.S. Pat. No. 5,774,283 to Nagel et al. It is also known to mount a lamp into the applique itself, with the lamp directly providing area illumination from the applique. See, for example, the Japanese patent document 62-218248 to Satoshi and the German patents DE 36 35 471 and DE 36 35 473 to Deicke and Ball, respectively.

To provide the best perspective for area illumination from these side mirror mounted lamps, it is desirable that they be mounted as far out on the side mirror as possible. However, doing so exposes them to various environmental hazards, including increased vibration which can reduce the life of the lamp. Thermal management of the lamps can also be difficult in such arrangements. Accordingly, there is a need for a side mirror assembly which provides illumination and/or signal lighting from an outboard location on the mirror assembly, while avoiding some of the disadvantages of locating the lamp at that same location.

SUMMARY OF THE INVENTION

In accordance with the invention, there is provided a side mirror assembly for a vehicle that utilizes a waveguide to route light from a location at the vehicle/mirror assembly interface to an outboard location on the mirror assembly. The side mirror assembly includes the waveguide, a mounting member, and a reflective element such as a mirror attached to the mounting member. The mounting member has a mounting surface for attachment of the mounting member to the vehicle, and the waveguide extends from a first location proximate the mounting surface to a second location proximate the reflective element. Preferably, the waveguide is located within the mounting member with the light exiting the waveguide and mounting member through an opening in the mounting member.

The waveguide can be used to provide area illumination from the side mirror assembly, or to provide brake or turn signal lighting. In accordance with another aspect of the invention, a stacked waveguide arrangement can be used so that these multiple lighting functions can be incorporated together into the mirror assembly.

In accordance with another aspect of the invention, the mounting member comprises a mirror mount or applique that supports a separate housing containing the mirror, with the waveguide extending through the mirror mount and being optically coupled to a second waveguide that then routes the light to an outboard location in the mirror housing. When used on a breakaway side mirror assembly of the type that allows the mirror to pivot relative to the mirror mount, the optical coupling can be located such that at least a portion of the light couples between the waveguides regardless of the relative pivotal position of the mirror and mirror mount. For this purpose, semi-circular reflective surfaces on the two waveguides can be used to maintain good optical coupling regardless of the pivotal position of the mirror.

BRIEF DESCRIPTION OF THE DRAWINGS

Preferred exemplary embodiments of the invention will hereinafter be described in conjunction with the appended drawings, wherein like numerals denote like elements, and wherein.

DETAILED DESCRIPTION OF THE PREFERRED EMBODIMENTS

As used herein, and except where the context otherwise obviously requires, directional terms such as upper, lower, downward, forward, front, rear, and outboard all refer to the directions that the associated component or assembly takes on when the invention is incorporated into its intended application on a vehicle.

Rear/Side Illumination and Signaling From the Applique

Figures 1, 2A, 2B:
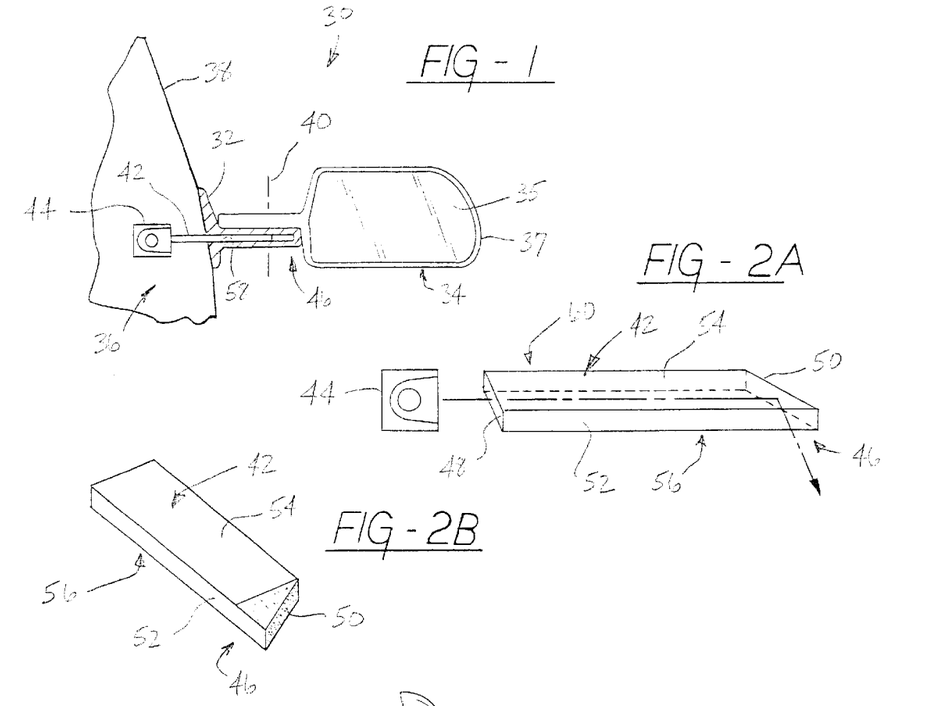
FIG. 1 is a partially diagrammatic view of a first embodiment of the invention, showing a side mirror, applique, and illumination assembly as it might be used for rearwardly directed illumination or signaling.
FIG. 2A is a partially diagrammatic and partially perspective view of the waveguide used in the illumination assembly shown in FIG. 1.
FIG. 2B is an end perspective view of the waveguide of FIG. 2A with its end being aluminized to minimize light loss.

FIG. 1 depicts a side mirror assembly 30 for a vehicle. The assembly includes a mirror mount or applique 32, a breakaway side mirror 34, and an illumination assembly 36 which provides rearwardly directed light that can be used for purposes of illumination along the side of the vehicle or as a turn signal indicator for pedestrians and other motorists. Applique 32 is mounted on the vehicle door panel 38 or to some other side body panel and is used to support side mirror 34 such that it can rotate about an axis 40 to thereby help protect the laterally extending side mirror 34 from damage. As shown, side mirror 34 includes both a mirror or other reflective element 35 and a mirror housing 37, with the mirror 35 being mechanically or electrically positionable within housing 37. Although FIG. 1 and the other various embodiments discussed herein are directed to a side mirror assembly having a breakaway mirror, it will of course be appreciated that the side mirror can be rigidly mounted to the vehicle via the applique or can be directly mounted to the vehicle without the use of a separate applique. Thus, either the applique or mirror housing can be utilized as a mounting member for the mirror. Moreover, it will be appreciated that the various views of the different illustrated embodiments of the side mirror assembly and its component parts are primarily for purposes of depicting the various features of those embodiments. The actual dimensions, shapes, and configurations of any manufactured assembly incorporating the invention may vary significantly from that illustrated in the appended drawings, depending upon the stylistic, spatial, and functional considerations involved in a particular application.

Extending from the door panel 38 into applique 32 is a waveguide 42 that is used to route light from a standard T5 illuminator 44 located in door panel 38 to an outboard location 46 near the free end of applique 32. Preferably, waveguide 42 is a plastic component that can be injection molded or extruded and then post-processed to the desired configuration. Illuminator 44 can be any desired light source, including an incandescent lamp, HID lamp, or LED. Referring now also to FIG. 2A, light from illuminator 44 enters a first longitudinal end 48 of waveguide 42, travels to an opposing, angled, longitudinal end 50 where it is reflected such that it exits waveguide 42 through a lateral side 52. As shown in FIG. 2B, longitudinal end 50 can be aluminized or otherwise coated with a reflective surface to maximize the reflection of light out through lateral side 52. Also, the upper and lower surfaces 54, 56 of waveguide 42 can be similarly aluminized or coated at its outboard location 46 proximate longitudinal end 50. Alternatively, upper and lower surfaces 54, 56 can be bead blasted and painted white at these locations.

Figure 3:
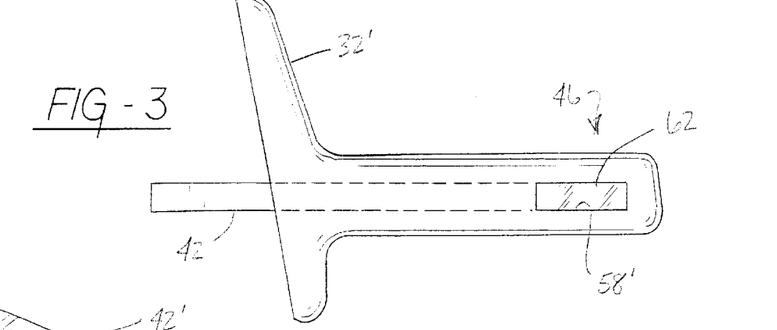
FIG. 3 is an elevational view of a first alternative embodiment of the applique used with the illumination assembly of FIG. 1.

Referring back to FIG. 1, applique 32 includes a slot 58 on its rearward side. This slot can extend from the interface of applique 32 with door panel 38 all the way to the outboard location 46 such that the lateral side 52 of waveguide 42 is exposed along a substantial portion of its length. If desired, waveguide 42 can be constructed such that light is emitted rearwardly along the entire length of slot 58. This can be accomplished by placing notches or other surface features (not shown) on the lateral side 52 of waveguide 42 or on the opposing lateral side 60, as will be appreciated by those skilled in the art. Alternatively, as shown in the embodiment of FIG. 3, slot 58' can be located only at the outboard location 46 and can be covered by a lens or window 62 such that waveguide 42 is entirely housed within applique 32'.

Figure 4:
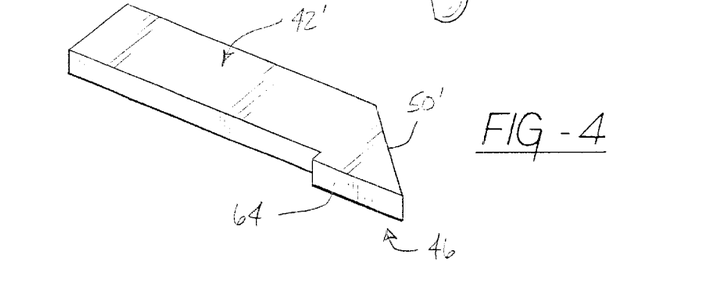
FIG. 4 is a perspective view of an alternative embodiment of the waveguide shown in FIG. 2A.

Moreover, rather than using lens 62, a waveguide 42' can be used as shown in FIG. 4, which includes a laterally extending portion 64 at its outboard location 46 that extends rearward into slot 58' such that the surface of portion 64 is flush with the outer surface of applique 32'.

As will be appreciated, the waveguides 42 and 42' of the embodiments shown in FIGS. 1–4 can be used either to provide area illumination along the side of the vehicle or to provide a turn signal or brake signal to pedestrians or other motorists. When used for providing illumination, illuminator 44 can be connected to the vehicle lighting system or an electronic control module, with illuminator 44 being activated concurrently with other vehicle interior or exterior lights. For example, illuminator 44 can be interconnected with the vehicle lighting system such that illuminator 44 is energized in response to the vehicle receiving a door unlock signal from a remote transmitter (not shown). Alternatively, illuminator 44 could also be activated in response to detection of an active or passive transponder. Optionally, illuminator 44 can be activated in response to a signal from a vehicle alarm system and can be activated in either a steady-state or flashing mode when the alarm is tripped, or can be pulsed one or more times to acknowledge arming or disarming of the alarm system. Also, when used for vehicle exterior illumination, the direction and/or intensity of the light emitted from the waveguides 42, 42' can be controlled or varied as desired. For example, waveguides 42, 42' can be used to provide light directed rearwardly along the side of the vehicle toward the vehicle door handle(s) and/or toward the rear wheel well.

When used for providing signaling to pedestrians and other motorists, illuminator 44 can be interconnected with the vehicle's turn signal and/or brake signal system so that illuminator 44 is activated concurrently with the vehicle's rear turn signal or brake lights. Also, light from illuminator 44 can be filtered such that the light exiting the waveguides 42, 42' will be suitably colored. For example, when used as a side-mounted turn signal, an amber filter (not shown) can be interposed between illuminator 44 and the waveguide 42 or 42' so that pedestrians and other motorists would see an amber flashing light upon activation by the driver of the turn signal lever. Similarly, when used to signal braking of the vehicle, a red filter (also not shown) can be interposed between illuminator 44 and the waveguide 42 or 42' so that a red warning light is seen upon application of the brakes by the driver. Of course, filtering of the light can be accomplished in other ways. For example, waveguides 42, 42' can be made from a suitably colored translucent plastic. Furthermore, the shape and angle of the longitudinal ends 50, 50' of the waveguides can be selected as will be discussed further below in connection with FIGS. 9, 10, and 17–19 to thereby control the direction of light exiting the waveguide so that, for example, the light can be directed both rearwardly and laterally away from the vehicle and, consequently, away from the vehicle's driver and occupants.

Before describing the remaining embodiments in detail, several advantages of the side mirror assembly and components shown in FIGS. 1–4 are worth noting. By routing light from door panel 38 into the side mirror assembly 30, the present invention avoids the necessity of locating a floodlight or other incandescent light source or illuminator within the applique or side mirror housing. This provides significant advantages since it reduces the room needed within the applique or mirror housing for the illumination system and eliminates wiring and heating problems caused by the use of incandescent lamps within the applique or mirror housing. Also, less weight is added to the side mirror which reduces mirror vibration concerns. The bulb used by the illuminator can also be better protected within the door panel from vibration and other environmental effects. If desired, the light provided to the waveguides 42, 42' can be routed from a remote location rather than from an illuminator located just inside the surface of the door panel at applique 22. In this regard, the light used by waveguides 42, 42' can originate at a central illuminator located either in the door panel or at some other remote location. This permits the invention to be used with an existing illuminator that supplies other vehicle lighting needs, in which case an LCD baffle or other optical device (not shown) can be interposed between the illuminator and waveguide 42, 42' to block light from the illuminator when it is energized for other purposes. As will be appreciated, the foregoing design considerations and advantages also apply to the additional embodiments described below.

Rear/Side/Ground Illumination and Signaling From the Applique

Figure 5:
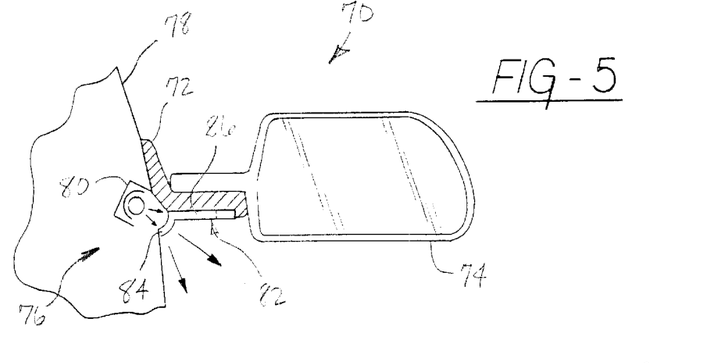
FIG. 5 is a partially diagrammatic view of a second embodiment of the invention, showing a side mirror, applique, and illumination assembly as it might be used for both downwardly and rearwardly directed illumination.

Referring now to FIG. 5, there is shown a second embodiment 70 of a side mirror assembly of the present invention. Side mirror assembly 70 includes an applique 72, side mirror 74, and illumination assembly 76 that provides both rearwardly and downwardly directed light for purposes of illuminating the area alongside the vehicle. As in the first embodiment, applique 72 is used to mount side mirror 74 to either the vehicle door panel 78 or to another side body panel. The illumination assembly 76 includes an illuminator 80 and waveguide 82 that can form a portion of the lower surface of applique 72. In particular, waveguide 82 includes a curved lens portion 84 and a planar portion 86, with the curved portion 84 providing downwardly directed general-purpose illumination and the planar portion 86 having an angled longitudinal end (as shown in FIG. 2A) that provides rearwardly directed illumination. Waveguide 82 can either form all or a portion of the lower surface of applique 72 or can be located internally behind a suitable opening formed within the applique.

Figure 6:
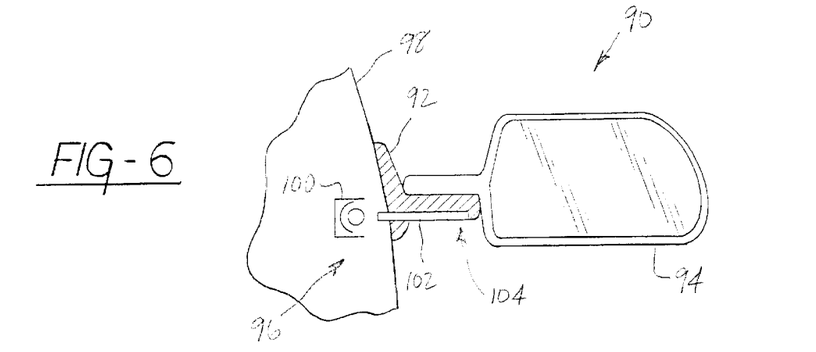
FIG. 6 is a partially diagrammatic view of a third embodiment of the invention, showing a side mirror, applique, and illumination assembly as it might be used for both downwardly and rearwardly directed illumination.

FIG. 6 depicts a third embodiment 90 of a side mirror assembly of the present invention. Side mirror assembly 90 includes an applique 92, side mirror 94, and illumination assembly 96 that provides both rearwardly and downwardly directed light. The applique 92 is used to mount side mirror 94 to either the vehicle door panel 98 or to another side body panel. Illumination assembly 96 includes an illuminator 100 and a waveguide 102 that provides both rearward and downwardly directed illumination, as will be described below in more detail in connection with FIGS. 7A–7C. Waveguide 102 extends along the lower portion of applique 92 and can either form a part of the lower housing of applique 92 or can be contained wholly within applique 92, in which case the applique can have an opening (preferably covered by a transparent window or lens) on both its rearward and lower surfaces at the outboard location 104 to thereby permit the light from waveguide 102 to exit in both the rearward and downward directions.

Figure 7A:
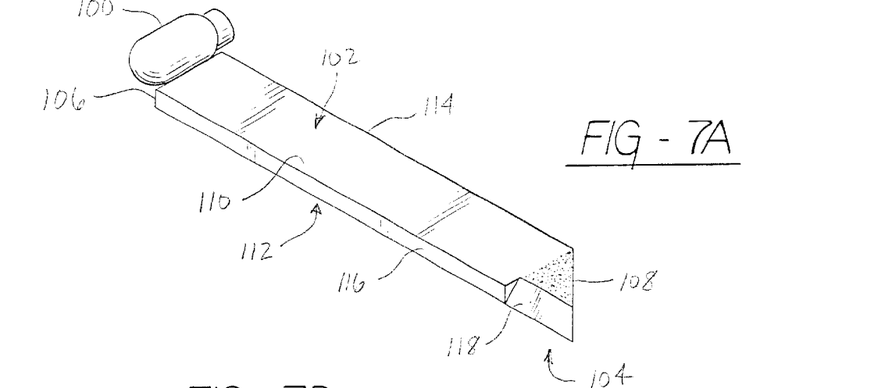
FIG. 7A is a perspective view of the waveguide used in the illumination assembly shown in FIG. 6.
Figure 7B:
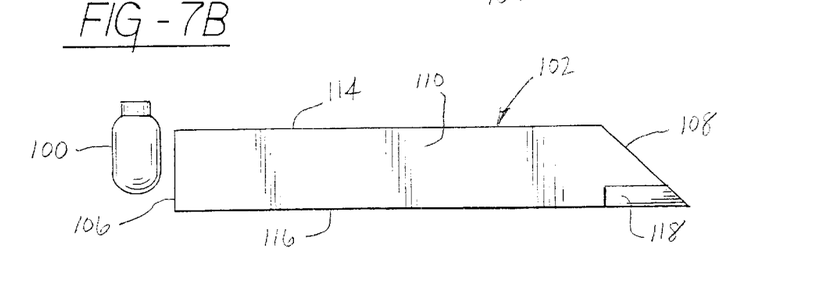
FIG. 7B is a top view of the waveguide of FIG. 7A.
Figures 7C, 8A:
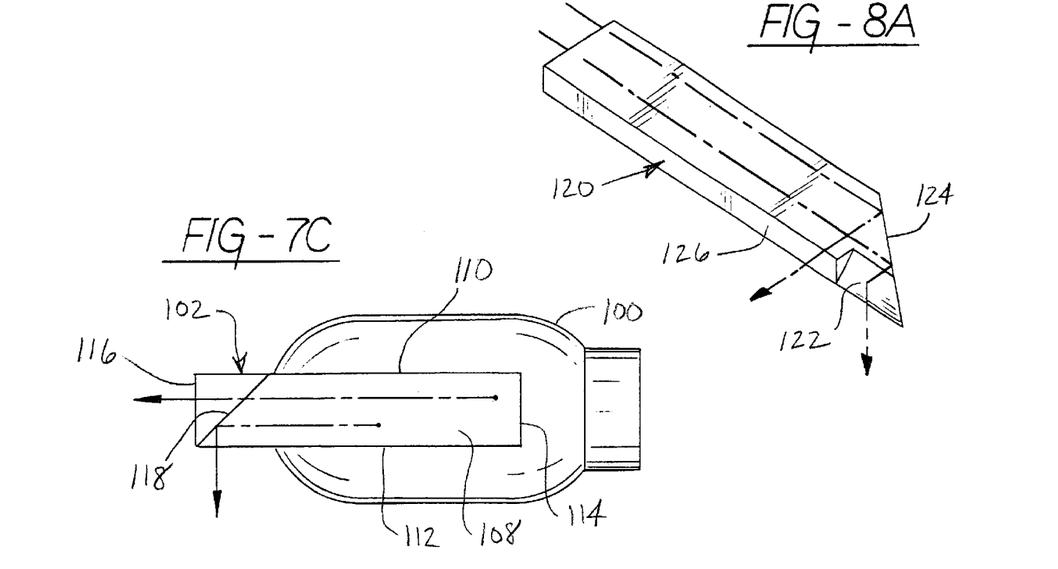
FIG. 7C is an end view of the waveguide of FIG. 7A.
FIG. 8A is a perspective view of the first alternative embodiment of the waveguide of FIG. 7A.

Referring now to FIGS. 7A–7C, further details of waveguide 102 are shown. Waveguide 102 comprises an elongated, unitary piece of transparent plastic extending from a first longitudinal end 106 to a second, angled longitudinal end 108. The first end 106 is located proximate illuminator 100, although as discussed above, waveguide 102 can instead be optically coupled to a remote illuminator via a fiber-optic or other waveguide. Waveguide 102 has a substantially planar conformation, but can be curved or have a varying cross-sectional shape, as desired or necessary for a particular application. Waveguide 102 includes an upper surface 110, a lower surface 112, a front surface 114, and a rear surface 116. Located at the outboard location 104 of waveguide 102 is a reflecting surface or facet 118 that is used to downwardly deflect at least some of the light internally reflected off end 108. This is shown by the exemplary light rays in FIG. 7C. As discussed above in connection with FIG. 2B, the surface of end 108 can be mirrored, aluminized, painted, or otherwise coated to maximize the rearward reflection of light traveling through waveguide 102 from illuminator 100. Also, the upper and lower surfaces 110, 112 can be mirrored, aluminized, painted, or otherwise coated at the outboard location 104, as shown in FIG. 7A. Of course, any of the other surfaces or surface portions (excluding surface 106 and surface 116 at the outboard location 104) can be aluminized, painted, stippled, or otherwise treated, either in whole or in part.

Figure 8B:
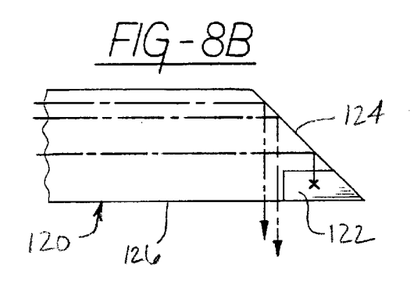
FIG. 8B is a partial top view of the waveguide of FIG. 8A.
Figure 9:
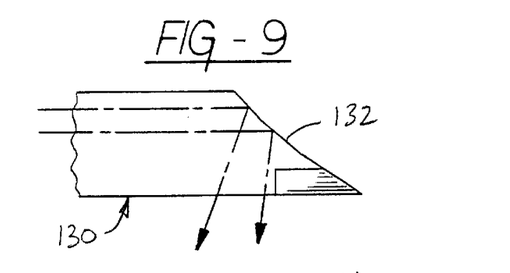
FIG. 9 is a partial top view of a second alternative embodiment of the waveguide of FIG. 7A.
Figure 10:
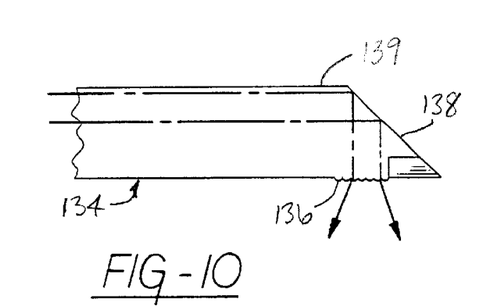
FIG. 10 is a partial top view of a third alternative embodiment of the waveguide of FIG. 7A.
Figure 11:
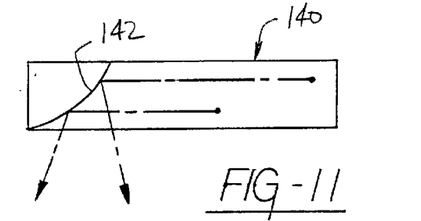
FIG. 11 is an end view of a fourth alternative embodiment of the waveguide of FIG. 7A.
Figure 12:
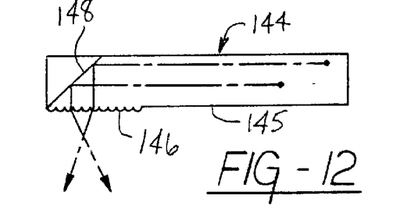
FIG. 12 is an end view of a fifth alternative embodiment of the waveguide of FIG. 7A.

If desired, the longitudinal extent of reflecting surface 118 can be shortened to decrease the amount of downwardly deflected light and increase the amount of rearwardly directed light. This is shown in FIGS. 8A and 8B which depict a waveguide 120 having a longitudinally-shortened, reflecting surface 122 which permits a portion of the light reflected off longitudinal end 124 to exit the rear surface 126 without encountering reflecting surface 122. FIG. 9 depicts a second alternative embodiment of the waveguide used in FIG. 6 in which the waveguide 130 shown therein includes a slightly concave longitudinal end 132 which has the effect of fanning out the light that is reflected rearwardly off the end 132. FIG. 10 depicts a third alternative embodiment 134 which includes surface features 136 that operate as lensing elements to increase the dispersion of the light reflected off longitudinal end 138. The surface features 136 can be used to direct the light upwardly, downwardly, and/or laterally. Furthermore, these surface features 136 can be located on end 138 or on front surface 139 at a location proximate end 138. FIG. 11 depicts a fourth alternative embodiment 140 in which the downwardly directing reflecting surface 142 has a concave conformation to help spread out the light that is internally reflected downwardly off surface 142. FIG. 12 depicts yet a fifth alternative embodiment 144 in which the lower surface 145 of waveguide 144 includes surface features 146 to provide both lateral and longitudinal dispersion of the light downwardly reflected off reflecting surface 148.

Rear/Side/Ground Illumination and Signaling From the Mirror Housing

Figures 13, 14A:
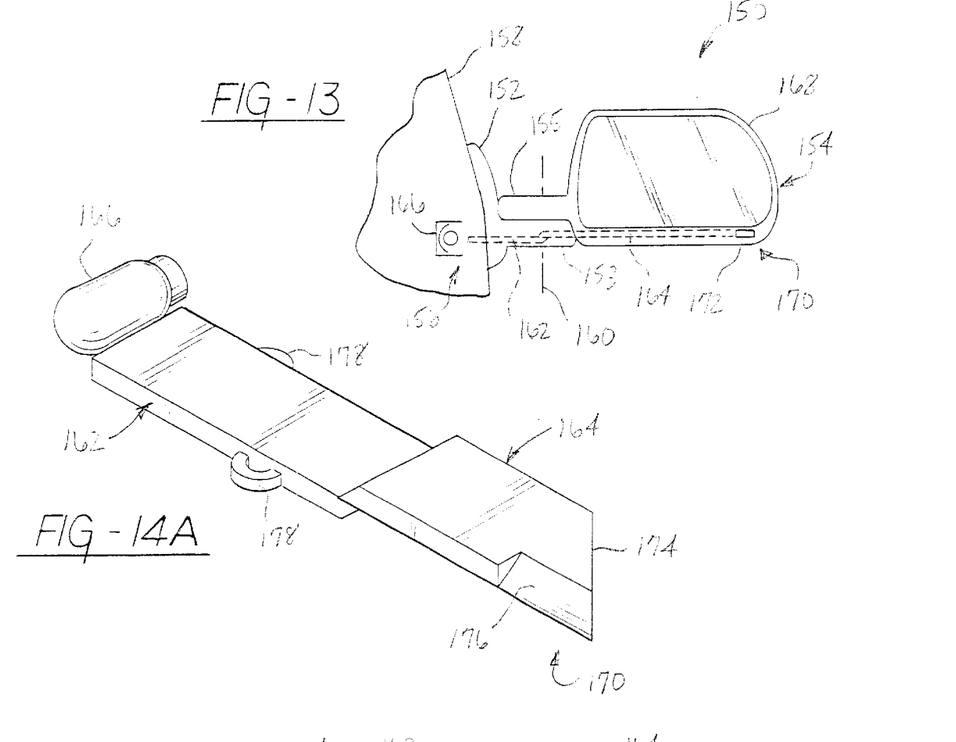
FIG. 13 is a partially diagrammatic view of a fourth embodiment of the invention, showing a breakaway side mirror, applique, and illumination assembly as it might be used in the breakaway mirror to provide rearwardly directed illumination or signaling from the side mirror housing.
FIG. 14A is a perspective view of the upper and lower waveguides used in illumination assembly shown in FIG. 13.

Turning now to FIG. 13, there is shown a fourth embodiment 150 of a side mirror assembly of the present invention. Side mirror assembly 150 includes an applique 152, breakaway side mirror 154, and an illumination assembly 156 that provides rearwardly directed light for illumination or signaling purposes. Applique 152 is mounted on the vehicle door panel 158 or to some other side body panel. Side mirror 154 is pivotally mounted to applique 152 such that the side mirror, 154 can rotate about an axis 160. Illumination assembly 156 includes a first waveguide 162, a second waveguide 164, and an illuminator 166. Waveguide 162 extends through applique 152 from a location proximate illuminator 166 to a location proximate axis 160 where it is optically coupled to waveguide 164 which extends through the opaque housing 168 of side mirror 154 to an outboard location 170 at the lower portion of housing 168. In operation, light supplied by illuminator 166 is conducted by internal reflection through waveguide 162 and then into waveguide 164 where it is conducted by internal reflection to the outboard location 170. The light exits at the outboard location 170 through a windowed opening 172 in housing 168. Although waveguide 164 is shown extending from applique 152 into side mirror 154, it will be appreciated that waveguide 162 can be located near the upper surface of the laterally extending portion 153 of applique 152 and waveguide 164 can be located externally of applique 152 in the laterally extending portion 155 of side mirror 154. Other such configurations will become apparent to those skilled in the art.

Waveguides 162 and 164 are shown in greater detail in FIGS. 14A–14D. As will be appreciated, waveguides 162 and 164 are essentially the same as the waveguide shown in FIGS. 7A–7C, except that the waveguide has been separated into two pieces to permit routing of the light into mirror housing 168 while accommodating the pivoting of housing 168 about axis 160. As with the foregoing embodiments, waveguides 162 and 164 comprise generally planar transparent plastic members, with waveguide 164 having an angled longitudinal end 174 for rearwardly directing light and a reflecting surface or facet 176 for downwardly directing light at outboard location 170. For this purpose, housing 168 will also include an opening (not shown) in its lower surface to accommodate the downwardly directed light reflecting off facet 176. It will be appreciated by those skilled in the art that the various surface conformations and surface features shown in the other waveguide embodiments disclosed herein can be used to control the direction and pattern of light exiting waveguide 164 at outboard location 170. Waveguide 162 also includes a pair of unitary connecting tabs 178 for mounting of waveguide 162. Of course, these connecting tabs 178 can be utilized for mounting of any of the waveguides discussed herein.

Figure 14B:
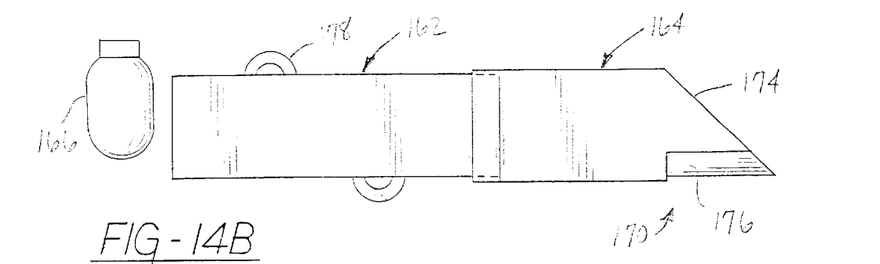
FIG. 14B is a top view of the waveguides of FIG. 14A.
Figure 14C:
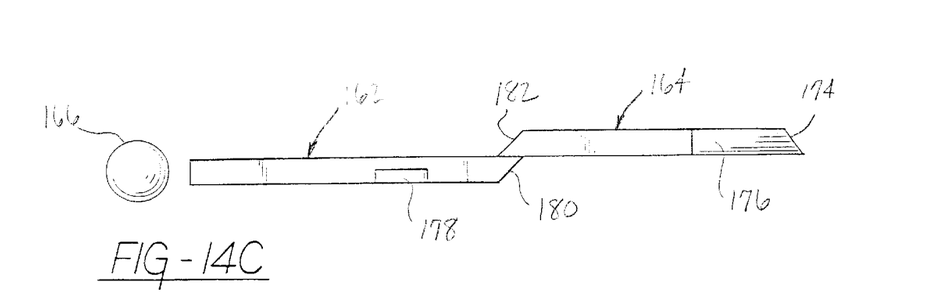
FIG. 14C is a side view of the waveguides of FIG. 14A.
Figure 14D:
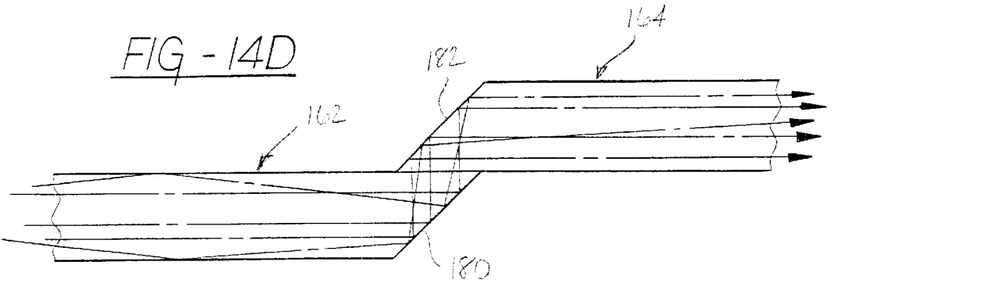
FIG. 14D is an enlarged, fragmentary side view of the waveguide of FIG. 14A, showing how light rays are optically coupled from the lower waveguide to the upper waveguide.
Figure 16:
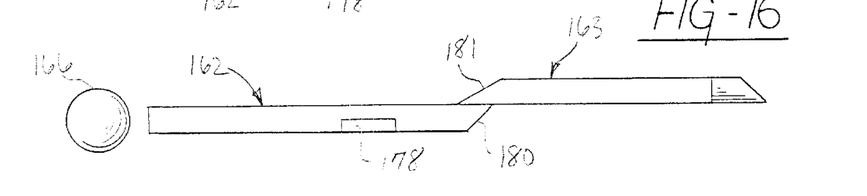
FIG. 16 is a side view of a first alternative embodiment of the waveguides of FIG. 14A which provides improved optical coupling between the upper and lower waveguides.

As illustrated in FIG. 14D, waveguides 162 and 164 are optically coupled together by reflecting surfaces 180 and 182, respectively. As shown, the surfaces are aligned such that light rays conducted along waveguide 162 are reflected upwardly by surface 180 out of waveguide 162 and into waveguide 164 where they are reflected toward the longitudinal direction of waveguide 164 by surface 182. Although the reflecting surfaces 180, 182 are shown at 45° in FIG. 14D, it will be appreciated that other angles and multiple facets can be used. For example, FIG. 16 shows an alternative embodiment in which waveguide 162 includes its 45° reflecting surface 180, whereas waveguide 163 has a 30° reflecting surface 181. This provides improve coupling between the waveguides, as the 30° reflecting surface helps capture all of the light rays reflected off the lower reflecting surface 180 when the two waveguides are properly aligned.

Figure 15A:
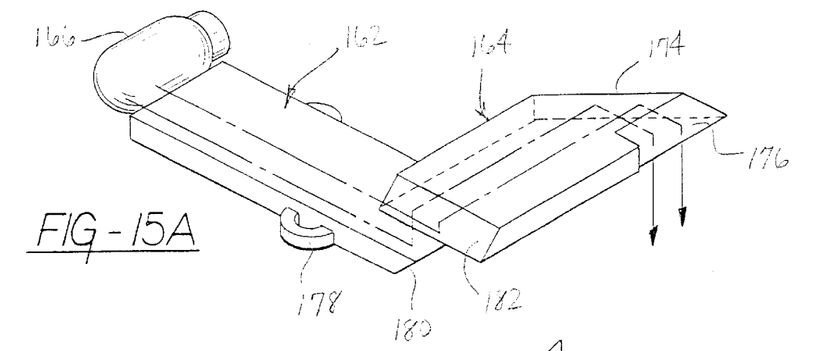
FIG. 15A is a perspective view of the waveguides of FIG. 14A, depicting the optical coupling between the upper and lower waveguides when the upper waveguide is rotated relative to the lower waveguide.
Figure 15B:
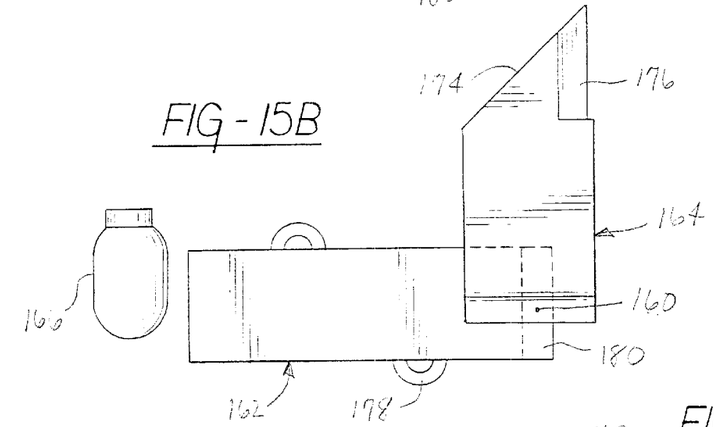
FIG. 15B is a top view of the waveguides of FIG. 14A when the upper waveguide is in the rotated position shown in FIG. 15A.

FIGS. 15A and 15B show the relative positioning of waveguide 162 and 164 when waveguide 164 is rotated forwardly along with mirror housing 168 about axis 160. Since axis 160 extends vertically through reflecting surfaces 180 and 182, a portion of the surfaces remains overlapped which permits a portion of the light rays traveling through waveguide 162 to be transferred to waveguide 164. Accordingly, illumination system 156 can remain operational even when side mirror 154 is pivoted forwardly or rearwardly from its normal operational position. Excess light that is reflected out of waveguide 162 and not picked up by waveguide 164 will be directed upwardly into and captured by the opaque mirror housing 168. If desired, waveguide 162 and 164 can be located such that axis 160 does not extend through the reflecting surfaces 180, 182 nor even through the waveguides, in which case illumination system 156 will not be operational to direct light out of side mirror 154 when it is rotated by a substantial angle either forwardly or rearwardly.

Figure 17:
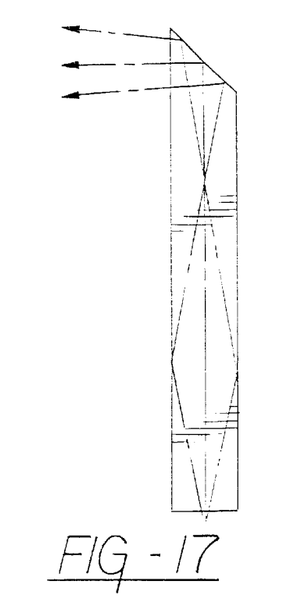
FIGS. 17–19 depict different single and compound angled end faces that can be used on the waveguides disclosed herein to control the shape and direction of light exiting the waveguide.
Figures 18, 19:
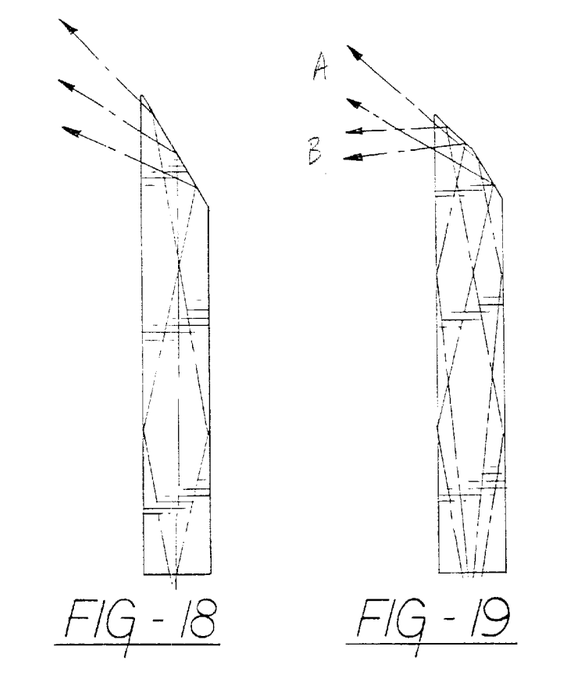

Turning now to FIGS. 17–19, it will be apparent by inspection of these figures that the downward and rearward directing of light can be controlled by suitable selection of the angle and/or faceting of the end surfaces of the waveguides. The angle of the end surface determines the angle at which light exits the waveguide, as can be seen by a comparison of FIGS. 17 and 18. As shown in FIG. 19, faceting of the end surface can be used to independently direct light into multiple areas, such as regions A and B.

Figure 20A:
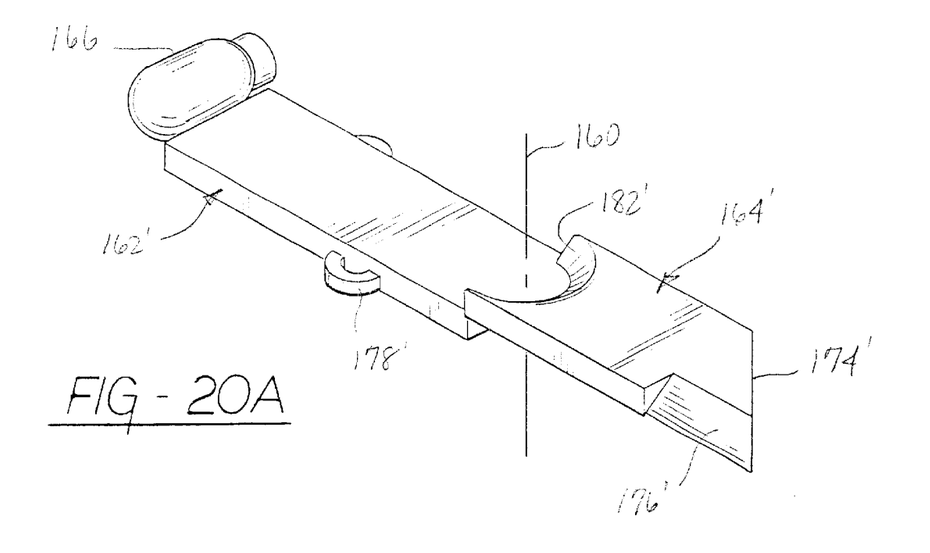
FIG. 20A is a perspective view of an alternative embodiment of the waveguides of FIG. 14A.
Figure 20B:
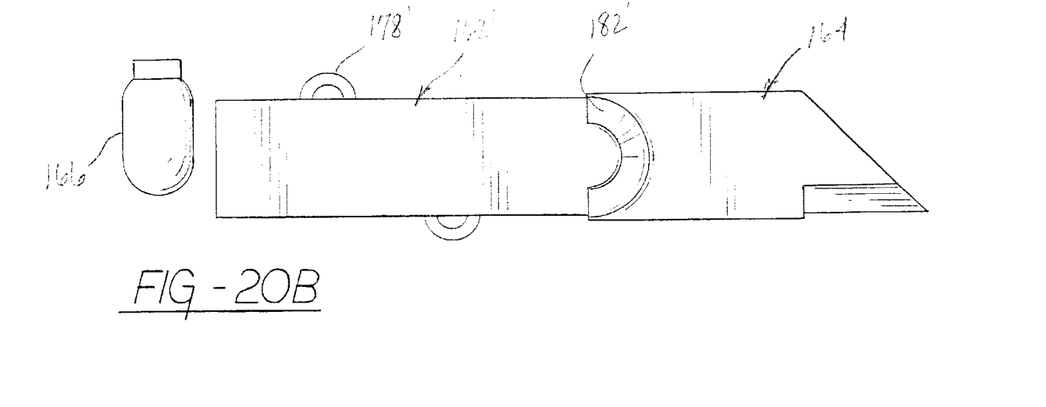
FIG. 20B is a top view of the waveguides of FIG. 20A.
Figure 20C:
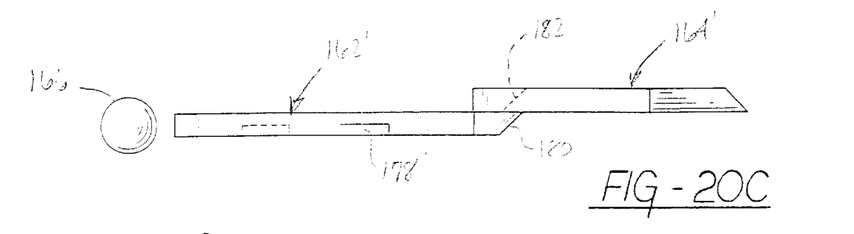
FIG. 20C is a side view of the waveguide of FIG. 20A.
Figure 21A:
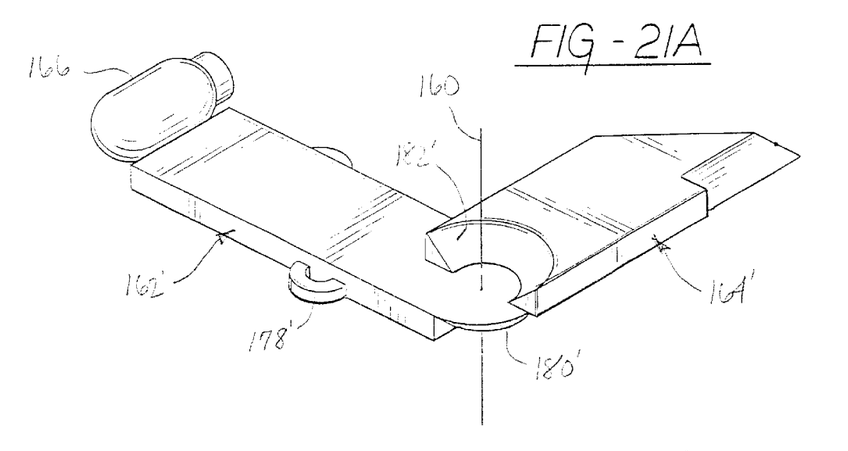
FIG. 21A is a perspective view of the waveguides of FIG. 20A, depicting the optical coupling between the upper and lower waveguides when the upper waveguide is rotated relative to the lower waveguide.
Figure 21B:
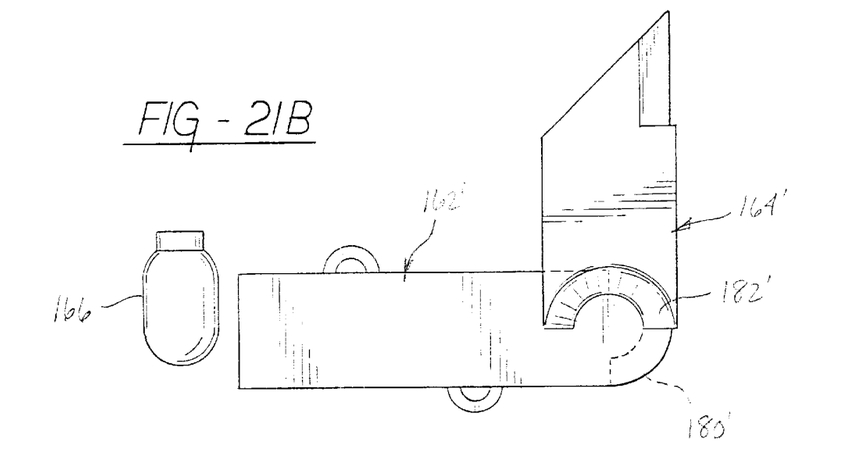
FIG. 21B is a top view of the waveguides of FIG. 20A when the upper waveguide is in the rotated position shown in FIG. 21A.

FIGS. 20A–20C depict various views of an alternative embodiment of the waveguides shown in FIGS. 14A–14D. The waveguides 162' and 164' are the same as waveguides 162 and 164, except in the region where they are optically coupled together. In particular, waveguides 162' and 164' include complementary, semicircular, angled reflecting surfaces 180' and 182' that are centered on axis 160. Preferably, reflecting surface 180' is disposed at an angle of approximately 45° and reflecting surface 182' is disposed at an angle of either 30° or 45°, although of course other angles could be utilized. FIGS. 21A and 21B show waveguide 164' rotated forwardly relative to waveguide 162' about axis 160. As will be appreciated from the top view shown in FIG. 21B, this semicircular, angled conformation of the reflecting surfaces 180' and 182' provide substantially more overlap than the configuration of FIGS. 15A–15B, thereby providing a greater portion of the light to the upper waveguide 164' when side mirror 154 is rotated from its normal operational position.

Combined Signalling and Illumination

Figure 22:
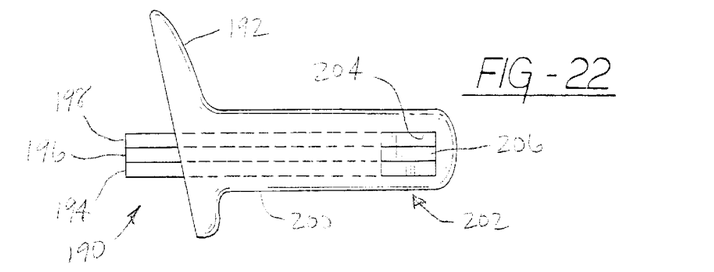
FIG. 22 is an elevational view of a second alternative embodiment of the applique used in the side mirror assembly of FIG. 1, showing stacked waveguides for providing brake signaling, turn signaling, and area illumination.
Figures 23, 24, 25:
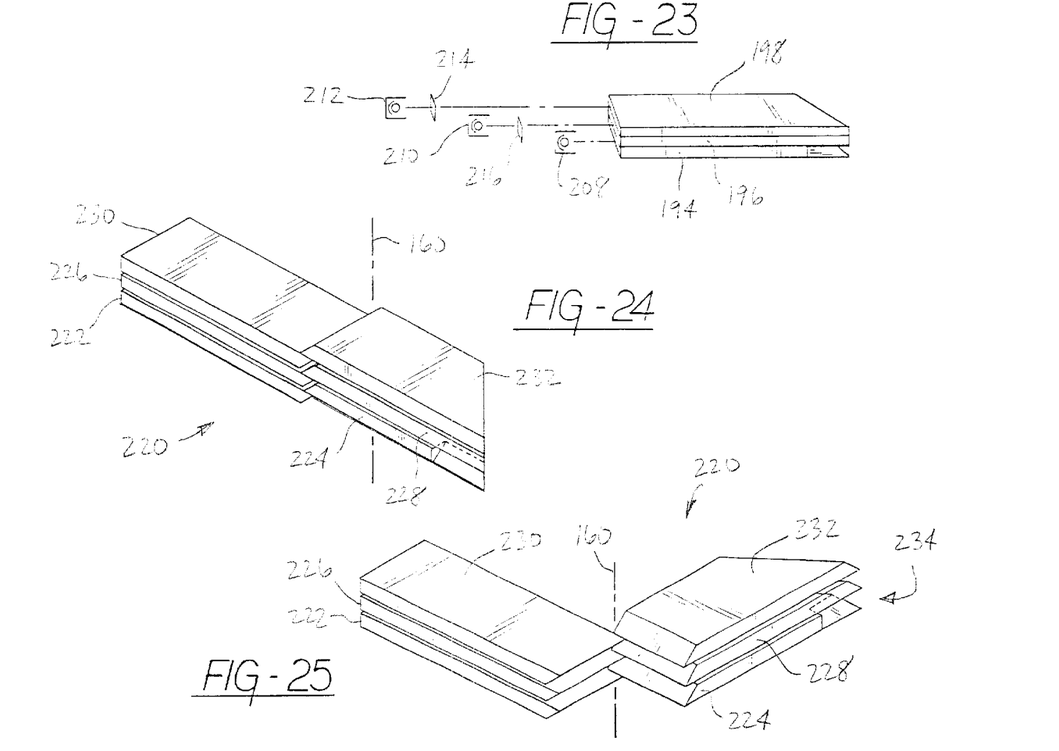
FIG. 23 is a partially diagrammatic and partially perspective view of the stacked waveguides shown in FIG. 22.
FIG. 24 is a perspective view of an alternative embodiment of the waveguides used in the illumination assembly depicted in FIG. 13, showing stacked waveguides as they might be used in a breakaway side mirror for providing brake signaling, turn signaling, and area illumination.
FIG. 25 is a partially exploded, perspective view of the stacked waveguides of FIG. 24, showing the outer waveguides rotated relative to the inner waveguides.

As shown in FIG. 22, rearward illumination, brake signaling, and turn signaling can all be integrated together into a single illumination assembly 190 that is incorporated into an applique 192. This can be accomplished using stacked waveguides of the type shown in FIGS. 2A, 2B, 4, and 7A–12. Illumination assembly 190 includes a lower waveguide 194, a middle waveguide 196, and an upper waveguide 198. Preferably, lower waveguide 194 it is utilized for exterior illumination and is located at the lower surface 200 of applique 192 so that it can direct light both rearwardly and downwardly through one or more suitable openings in applique 192. Middle waveguide 196 can be used as a side-mounted turn signal and upper waveguide 198 can be used as a side-mounted brake signal. Each of these waveguides directs light outwardly from applique 192 at its outboard location 202 through a rear opening 204 having a transparent lens or window 206. As indicated in FIG. 23, the three waveguides 194, 196, and 198 can each be optically coupled to separate illuminators 208, 210, and 212, respectively. Furthermore, as mentioned above, red and amber colored filters 214 and 216, respectively, can be used to provide signals of a suitable color.

FIGS. 24 and 25 show a stacked waveguide arrangement 220 that can be used in the same manner as illumination system 190 to route illumination and signal lighting through an applique (not shown) and into a side mirror housing (also not shown). In particular, illumination system 220 includes three pairs of optically coupled waveguides; namely, waveguides 222 and 224, waveguides 226 and 228, and waveguides 230 and 232. As will be appreciated, light traveling through waveguide 222 will be reflected upwardly into waveguide 224 and thereafter will exit waveguide 224 both rearwardly and downwardly at its outboard location 234. Similarly, light traveling through waveguide 226 will be reflected upwardly into waveguide 228 and light traveling through waveguide 230 will be reflected upwardly into waveguide 232. If desired, the reflecting surfaces as well as the planar surfaces of the waveguides can be aluminized or otherwise optically isolated from the adjacent waveguide pairs to prevent cross communication of light between adjacent waveguide pairs. Also, the pivot axis 160 is preferably located externally of the reflecting surfaces of the waveguides so that the waveguides 224 and 228 can be rotated about the axis 160 without interference with either waveguide 226 or 230. For example, as shown in FIG. 25, pivot axis 160 can be located so that it intersects or is located just outside the front surfaces of the waveguides near their reflecting surfaces.

Additional Embodiment

Figure 26:
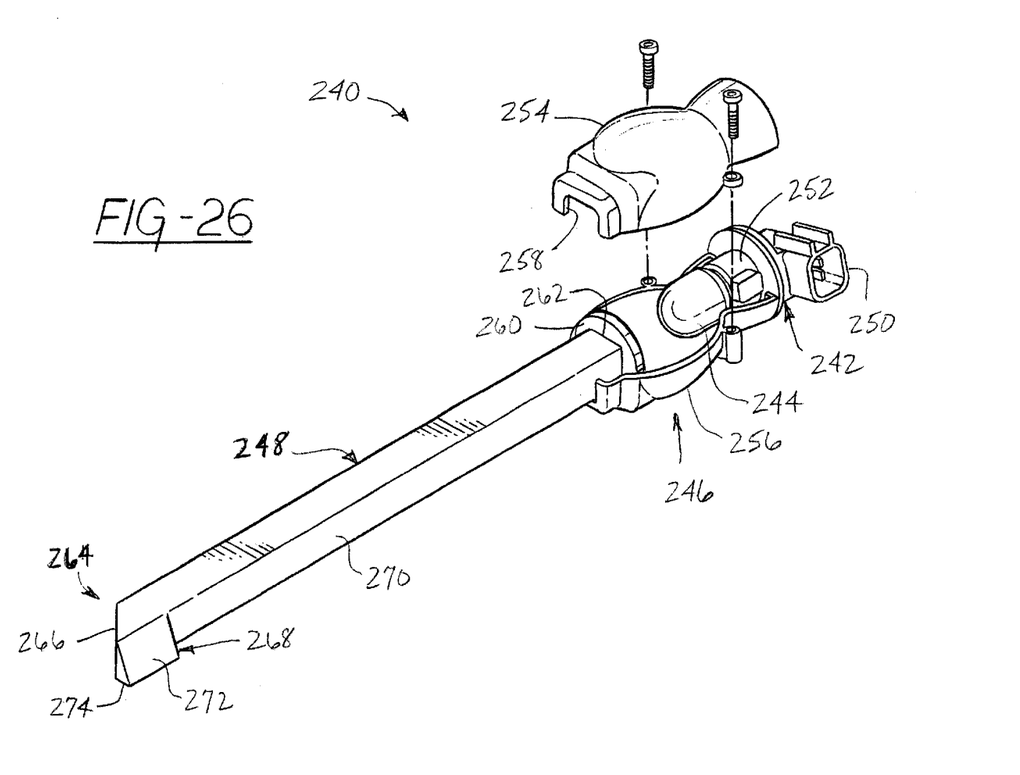
FIG. 26 is a perspective view of an alternative embodiment of the illumination assembly of FIG. 1.

Referring now to FIG. 26, an alternative embodiment of the illumination assembly 36 is shown and designated as 240. Assembly 240 primarily includes a socket 242, an incandescent or other light source 244, a reflector housing 246, and a waveguide 248. Socket 242 can be a plastic socket having an integral electrical connector 250 and base portion 252 into which light source 244 is received. Socket 242 can be of a number of the types of sockets commonly used in automotive applications, such as are available under the trademark ZANXX™ from Federal-Mogul Corporation of Southfield, Mich. Similarly, light source 244 can be an automotive incandescent lamp such as is available under the trademark Wagner Lighting™ from Federal-Mogul Corporation.

As shown, housing 246 comprises a two-piece housing including an upper portion 254 and a lower portion 256. As shown, lower portion 256 is integral with socket 242, although it will of course be appreciated that both portions could be separate from socket 242. Housing 246 is attached over lamp 244 and a portion of socket 242 to thereby substantially seal the lamp therein. Housing 246 can have reflective internal surfaces and an ellipsoidal or other shape to help direct light from lamp 244 into waveguide 248. Housing 246 has a rectangular exit opening 258 that is complementary in shape with the cross-sectional shape of waveguide 248. If desired or necessary, a lens or filter element 260 can be placed between the lamp 244 and waveguide 248 within housing 246 to, for example, filter the light entering the waveguide, protect the waveguide from heat, focus the light into the waveguide, or help secure the waveguide within the housing by bonding the waveguide to the element 260.

Waveguide 248 is an elongated piece of light transmissive material such as acrylic. It extends from a proximal end 262 to a distal, free end 264 that is located remote from the socket, lamp, and housing. The distal end 264 has an angled end face 266, as discussed above in connection with the waveguide of FIG. 2A. It also includes a lens 268 located along a portion of a lateral side 270 of the waveguide. This lens helps redirect light internally reflected off end face 266. In particular, lens 268 includes a rear face 272 that directs light rearwardly, as well as a lower face 274 that directs light downwardly. As will be appreciated by those skilled in the art, other suitable end configurations can be utilized, as required to achieve the output light distribution desired for a particular application.

Figure 27:
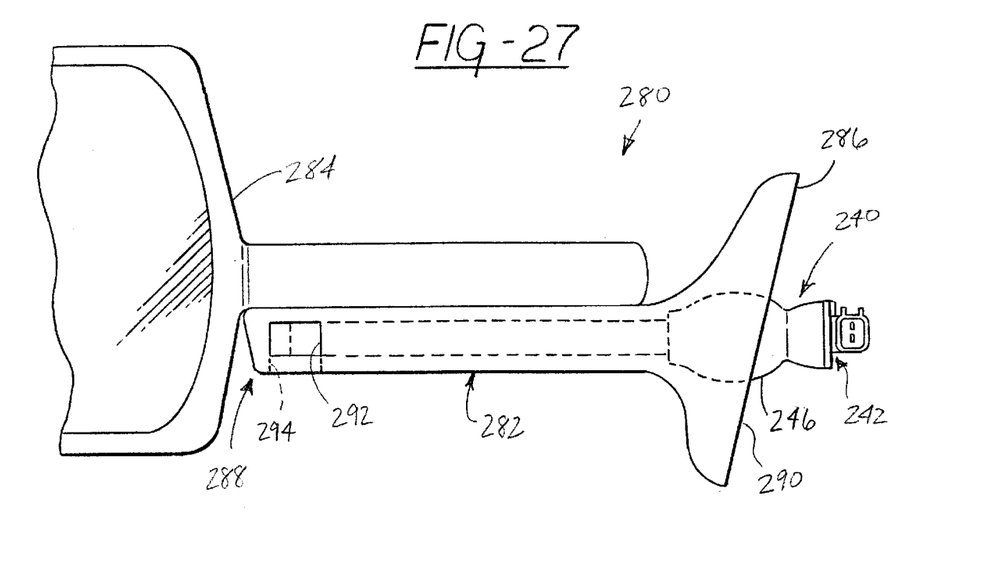
FIG. 27 is a partially diagrammatic view showing how the illumination assembly of FIG. 26 can be incorporated into the applique of FIG. 1.

FIG. 27 shows how the illumination assembly 240 of FIG. 26 can be incorporated into a side mirror assembly 280 that includes a mirror mount (applique) 282 and a side mirror 284. Although shown as a driver's side breakaway mirror assembly, it will be understood that, as discussed in connection with FIG. 1, mirror 284 can be mounted directly to the vehicle and either the applique or the side mirror housing can be used as a mounting member for the mirror. As shown, illumination assembly 240 is mounted within applique 282 such that the socket 242, lamp 244, and housing 246 are located at a mounting surface 286 of the applique with the distal end 264 of the waveguide being located at a remote end 288 of the applique. The mounting surface 286 defines an opening 290 into which the illumination assembly 240 extends. The illumination assembly can be mounted to the applique at this opening by attaching housing 246 and/or socket 242 to the applique.

Light exiting the housing 246 and entering waveguide 248 travels along the length of the waveguide, and thereafter exits the waveguide at the distal end 264, primarily through the rear and lower faces 272, 274 of the lens 268. The rearwardly directed light exits through a first opening 292 in the applique and the downwardly directed light exits through a second opening 294. Located in each of these openings is a sealed light transmissive window.

As shown, the illumination assembly is mounted to the applique such that they extend on both sides of the opening 290 in the mounting surface. Thus, when assembled onto a vehicle, the connector 250 of socket 242 will be located inside the door panel itself and the lamp will be located at the interface between the applique and the door, rather than in the door itself (as in other embodiments described above) or in the applique (as has been done in the prior art by others). As discussed above, this provides a number of advantages, including improved protection for the lamp from vibration and other environmental effects.

It will thus be appreciated that there has been provided in accordance with the present invention a side mirror assembly that achieves the aims and advantages specified herein. It will of course be understood that the foregoing description is directed to preferred exemplary embodiments of the invention and that the invention is not limited to the embodiments shown. Other various changes and modifications will become apparent to those skilled in the art. For example, the waveguides disclosed herein can be used to route light to a location located behind the reflective element of the side mirror, where the light can then be directed rearwardly through an (at least partially) optically transmissive portion of the reflective element. All such variations are intended to come within the scope of the appended claims.

We claim:

1. A side mirror assembly for a vehicle, comprising:
    a mounting member having a mounting surface for attachment of said mounting member to the vehicle;
    a reflective element attached to said mounting member at a location spaced from said mounting surface; and
    a waveguide contained within said mounting member and extending from a first location proximate said mounting surface to a second location proximate said reflective element;
    wherein said waveguide has an end located at said second location, said end having at least one surface feature oriented to direct light downwardly from said mounting member at said second location to thereby provide area illumination below said side mirror assembly.

2. A side mirror assembly as defined in 1, wherein said mounting member comprises a mirror housing and wherein said reflective element is mounted in said mirror housing.

3. A side mirror assembly as defined in claim 1, wherein said mounting member comprises a mirror mount and wherein said side mirror assembly further comprises a housing attached to said mirror mount, with said reflective element being mounted in said housing.

4. A side mirror assembly as defined in claim 3, wherein said second location comprises an outboard location within said mirror mount, with said mirror mount including a light transmissive opening at said outboard location, wherein light traveling through said waveguide from said first location is directed out of said waveguide and mirror mount through said opening.

5. A side mirror assembly as defined in claim 3, wherein said waveguide extends through said mirror mount and into said housing.

6. A side mirror assembly as defined in claim 1, wherein said surface feature comprises at least one facet oriented to direct light downwardly from said mounting member at said second location.

7. A side mirror assembly as defined in claim 1, further comprising an illuminator located externally of said mounting member, said illuminator being optically coupled to said waveguide at said first location.

8. A side mirror assembly for a vehicle, comprising:
    a mounting member having a mounting surface for attachment of said mounting member to the vehicle;
    a reflective element attached to said mounting member at a location spaced from said mounting surface; and
    a waveguide contained within said mounting member and extending from a first location proximate said mounting surface to a second location proximate said reflective element;
    wherein said mounting member comprises a mirror mount and wherein said side mirror assembly further comprises a housing attached to said mirror mount, with said reflective element being mounted in said housing;
    wherein said second location comprises an outboard location within said mirror mount, with said mirror mount including a light transmissive opening at said outboard location, wherein light traveling through said waveguide from said first location is directed out of said waveguide and mirror mount through said opening; and
    wherein said waveguide extends longitudinally from said first location to said second location and wherein said waveguide has an angled end at said second location with said angled end being oriented such that light traveling through said waveguide from said first location to said second location is laterally directed out of said waveguide by said angled end.

9. A side mirror assembly as defined in claim 8, wherein said opening is in a rearward portion of said mirror mount and said angled end of said waveguide is oriented to direct light laterally out of said waveguide and through said opening in said rearward portion of said mirror mount.

10. A side mirror assembly as defined in claim 9, wherein said waveguide includes a laterally extending portion at its angled end, with said laterally extending portion being located within said opening of said mirror mount.

11. A side mirror assembly as defined in claim 10, further comprising a transparent lens in said opening of said mirror mount.

12. A side mirror assembly as defined in claim 8, wherein said angled end includes a reflective layer located thereon such that light transmitted through said waveguide from said first location and impinging on said reflective layer is reflected out of a lateral side of said waveguide.

13. A side mirror assembly for a vehicle, comprising:
    a mounting member having a mounting surface for attachment of said mounting member to the vehicle;
    a reflective element attached to said mounting member at a location spaced from said mounting surface; and
    a waveguide contained within said mounting member and extending from a first location proximate said mounting surface to a second location proximate said reflective element;
    wherein said mounting member comprises a mirror mount and wherein said side mirror assembly further comprises a housing pivotally attached to said mirror mount such that said housing pivots about an axis, with said reflective element being mounted in said housing; and wherein said second location comprises an outboard location within said mirror mount, with said mirror mount including a light transmissive opening located proximate said outboard location such that said opening is located farther away from said mounting surface than said axis is from said mounting surface, wherein light traveling through said waveguide from said first location is directed out of said waveguide and mirror mount through said opening.

14. A side mirror assembly for a vehicle, comprising:

a mounting member having a mounting surface for attachment of said mounting member to the vehicle;

a reflective element attached to said mounting member at a location spaced from said mounting surface;

a waveguide contained within said mounting member and extending from a first location proximate said mounting surface to a second location proximate said reflective element;

wherein said mounting member comprises a mirror mount and wherein said side mirror assembly further comprises a housing attached to said mirror mount, with said reflective element being mounted in said housing; and a lens located adjacent said waveguide at said first location, wherein said lens has an interior surface and an exterior surface and is oriented such that light entering said lens from said interior surface is downwardly directed by said lens to thereby provide downwardly directed illumination below said mirror mount.

15. A side mirror assembly as defined in claim 14, wherein said lens is a unitary part of said waveguide.

16. A side mirror assembly as defined in claim 14, wherein said mirror mount has a lower surface and wherein said waveguide comprises at least a portion of said lower surface.

17. A side mirror assembly as defined in claim 16, wherein said mirror mount has a lower surface having a light transmissive opening at said second location and wherein said waveguide includes at least one end surface oriented to direct light out of said waveguide and through said opening.

18. A side mirror assembly for a vehicle, comprising:

a mounting member having a mounting surface for attachment of said mounting member to the vehicle;

a reflective element attached to said mounting member at a location spaced from said mounting surface;

a first waveguide contained within said mounting member and extending from a first location proximate said mounting surface to a second location proximate said reflective element;

wherein said mounting member comprises a mirror mount and wherein said side mirror assembly further comprises a housing attached to said mirror mount, with said reflective element being mounted in said housing; and a second waveguide extending from said mirror mount into said housing.

19. A side mirror assembly as defined in claim 18, wherein said second waveguide extends through said housing to an outboard location in said housing.

20. A side mirror assembly as defined in claim 18, wherein said housing is pivotally attached to said mirror mount, whereby said housing and reflective element together comprise a breakaway mirror.

21. A side mirror assembly for a vehicle comprising:

a mounting member having a mounting surface for attachment of said mounting member to the vehicle;

a reflective element attached to said mounting member at a location spaced from said mounting surface;

a first waveguide contained within said mounting member and extending from a first location proximate said mounting surface to a second location proximate said reflective element;

wherein said mounting member comprises a mirror mount and wherein said side mirror assembly further comprises a housing attached to said mirror mount, with said reflective element being mounted in said housing;

a second waveguide extending from said mirror mount into said housing;

wherein said housing is pivotally attached to said mirror mount, whereby said housing and reflective element together comprise a breakaway mirror; and wherein said first and second waveguides each includes an end having a reflecting surface, with said waveguides being optically coupled to each other by said reflecting surfaces.

22. A side mirror assembly as defined in claim 21, wherein said housing pivots relative to said mirror mount about a pivot axis that extends though said waveguides at said reflective surfaces.

23. A side mirror assembly as defined in claim 22, wherein said reflective surfaces are semicircular and are centered about said pivot axis, whereby at least a portion of the light exiting said first waveguide is received by said second waveguide when said housing is pivoted rearwardly about said pivot axis.

24. A side mirror assembly as defined in claim 21, wherein said reflecting surface of said first waveguide has a different angle than said reflecting surface of said second waveguide.

25. A side mirror assembly as defined in claim 24, wherein said reflecting surface of said first waveguide has an angle of approximately thirty degrees and said reflecting surface of said second waveguide has an angle of approximately forty-five degrees.

26. A side mirror assembly for a vehicle, comprising:

a mounting member having a mounting surface for attachment of said mounting member to the vehicle;

a reflective element attached to said mounting member at a location spaced from said mounting surface;

a first waveguide contained within said mounting member and extending from a first location proximate said mounting surface to a second location proximate said reflective element;

wherein said mounting member comprises a mirror mount and wherein said side mirror assembly further comprises a housing attached to said mirror mount, with said reflective element being mounted in said housing; and a second waveguide contained within said housing, wherein said first and second waveguides are optically coupled together such that at least a portion of the light transmitted through said first waveguide from said first location to said second location enters said second waveguide.

27. A side mirror assembly as defined in claim 26, wherein said facet is located on a lateral side of said waveguide.

28. A side mirror assembly as defined in claim 26, wherein said end comprises an angled end oriented such that a first portion of light traveling through said waveguide from said first location to said second location is laterally directed out of said waveguide by said angled end and a second portion of the light is laterally directed by said angled end and then downwardly directed by said one or more facets, whereby said waveguide provides both rearwardly and downwardly directed light.

29. A side mirror assembly as defined in claim 26, wherein said end includes at least one curved surface.

30. A side mirror assembly as defined in claim 26, wherein said end includes one or more lensing elements.

31. A side mirror assembly for a vehicle, comprising:
   a mounting member having a mounting surface for attachment of said mounting member to the vehicle;
   a reflective element attached to said mounting member at a location spaced from said mounting surface;
   a waveguide contained within said mounting member and extending from a first location proximate said mounting surface to a second location proximate said reflective element; and
   an illuminator located at said mounting surface of said mounting member.

32. A side mirror assembly as defined in claim 31, wherein said waveguide is attached to said illuminator and said illuminator is mounted to said mounting member proximate said mounting surface.

33. A side mirror assembly for a vehicle, comprising:
   a mounting member having a mounting surface for attachment of said mounting member to the vehicle;
   a reflective element attached to said mounting member at a location spaced from said mounting surface;
   a waveguide contained within said mounting member and extending from a first location proximate said mounting surface to a second location proximate said reflective element; and
   an illuminator located at said mounting surface of said mounting member;
   wherein said mounting surface defines an opening in said mounting member and wherein said illuminator extends through said opening on either side of said opening such that, when said mounting surface is attached to a door panel, a portion of said illuminator is located within the door panel.

34. A side mirror assembly for a vehicle, comprising:
   a mounting member having a mounting surface for attachment of said mounting member to the vehicle;
   a reflective element attached to said mounting member at a location spaced from said mounting surface;
   a first elongated waveguide contained within said mounting member and extending from a first location proximate said mounting surface to a second location proximate said reflective element; and
   a second elongated waveguide that extends through said mounting member adjacent said first waveguide, wherein light traveling through said second waveguide from a location proximate said first location is directed out of said second waveguide and out of said mounting member through an opening located proximate said second location.

35. A side mirror assembly as defined in claim 34, wherein said fast waveguide is stacked on top of said second waveguide.

36. A side mirror assembly as defined in claim 35, wherein said second waveguide includes an end located at said second location, said end having at least one facet oriented to direct light downwardly from said mounting member at said second location.

37. A side mirror assembly as defined in claim 34, further comprising a third waveguide that extends through said mounting member adjacent said first and second waveguides.

38. A side mirror assembly as defined in claim 34, wherein:
   said mounting member comprises a mirror mount and wherein said side mirror assembly further comprises a housing attached to said mirror mount, with said reflective element being mounted in said housing;
   said first and second waveguides comprise a first set of waveguides;
   said side mirror assembly further comprises a second set of waveguides, wherein said second set includes a third waveguide optically coupled to said first waveguide and a fourth waveguide optically coupled to said second waveguide;
   said second set of waveguides being supported by said housing, whereby light entering said any of said first set of waveguides at said first location is transmitted to an associated waveguide in said second set at said second location.

39. A side mirror assembly as defined in claim 38, wherein said housing is pivotally attached to said mounting member with said second set of waveguides being pivotal relative to said first set of wave guides.

* * * * *

UNITED STATES PATENT AND TRADEMARK OFFICE
CERTIFICATE OF CORRECTION

PATENT NO. : 6,685,325 B1
DATED : February 3, 2004
INVENTOR(S) : George Robert Hulse and John Christopher Brown It is certified that error appears in the above-identified patent and that said Letters Patent is hereby corrected as shown below:

Column 16,
Line 14, delete "fast" and insert therefor -- first --.

Signed and Sealed this

Nineteenth Day of October, 2004

JON W. DUDAS
*Director of the United States Patent and Trademark Office*